US007907133B2

(12) United States Patent
Joffer et al.

(10) Patent No.: US 7,907,133 B2

(45) Date of Patent: Mar. 15, 2011

(54) PIXEL INTERLEAVING CONFIGURATIONS FOR USE IN HIGH DEFINITION ELECTRONIC SIGN DISPLAYS

(75) Inventors: Brent A. Joffer, Brookings, SD (US); Brett D. Wendler, Watertown, SD (US); Glenn P. Luke, Brookings, SD (US); Nathan L. Nearman, Brookings, SD (US); Chad N. Gloege, Brookings, SD (US); Matt R. Mueller, Brookings, SD (US); Shannon Lee Mutschelknaus, Brookings, SD (US); Joseph G. Schulte, Brookings, SD (US); Eric S. Bravek, Brookings, SD (US); Ryan M. Hansen, Watertown, SD (US)

(73) Assignee: Daktronics, Inc., Brookings, SD (US)

( * ) Notice: Subject to any disclaimer, the term of this patent is extended or adjusted under 35 U.S.C. 154(b) by 1006 days.

(21) Appl. No.: 11/786,720

(22) Filed: Apr. 12, 2007

(65) Prior Publication Data

US 2008/0225143 A1 Sep. 18, 2008

Related U.S. Application Data

(60) Provisional application No. 60/791,808, filed on Apr. 13, 2006.

(51) Int. Cl.
*G06F 3/038* (2006.01)

(52) U.S. Cl. ............ 345/204; 345/76; 345/83; 348/100

(58) Field of Classification Search .................... 345/30, 345/39, 55, 76–83, 204, 418; 348/280, E5.131, 348/E9.024, E9.027, 100, 742; 40/564, 574
See application file for complete search history.

(56) References Cited

U.S. PATENT DOCUMENTS

| | | | |
|---|---|---|---|
| 3,291,975 | A | 12/1966 | Mccullough et al. |
| 3,594,761 | A | 7/1971 | Boesen |
| 4,234,914 | A | 11/1980 | Boesen |
| 4,659,876 | A | 4/1987 | Sullivan et al. |
| 5,020,253 | A | 6/1991 | Lie et al. |
| 5,184,116 | A | 2/1993 | Daugherty et al. |
| 5,198,723 | A | 3/1993 | Parker |
| 5,353,536 | A | 10/1994 | Erber et al. |
| 5,559,529 | A | 9/1996 | Maher |
| 5,617,657 | A | 4/1997 | Kahn |
| 5,743,610 | A | 4/1998 | Yajima et al. |
| 5,759,044 | A | 6/1998 | Redmond |
| 5,949,581 | A | 9/1999 | Kurtenbach et al. |

(Continued)

FOREIGN PATENT DOCUMENTS

EP 1202162 A1 5/2002

(Continued)

OTHER PUBLICATIONS

"U.S. Appl. No. 11/271,404, Election filed Jan. 7, 2009 in response to Official Action mailed Jan. 2, 2009", 12 pgs.

(Continued)

*Primary Examiner* — Kimnhung Nguyen
(74) *Attorney, Agent, or Firm* — Schwegman, Lundberg & Woessner, P.A.

(57) ABSTRACT

Pixel interleaving configurations for use in high definition electronic sign displays where each and every scan line includes full red, green, and blue color representation to provide for high resolution electronic video sign displays.

21 Claims, 8 Drawing Sheets

U.S. PATENT DOCUMENTS

| | | | | |
|---|---|---|---|---|
| 6,309,074 | B1 | 10/2001 | Inbar et al. | |
| 6,314,669 | B1 | 11/2001 | Tucker | |
| 6,414,650 | B1 | 7/2002 | Nicholson et al. | |
| 6,661,429 | B1 | 12/2003 | Phan | |
| 6,677,918 | B2 | 1/2004 | Yuhara et al. | |
| D487,779 | S | 3/2004 | Rose | |
| 6,705,033 | B1 | 3/2004 | Greene et al. | |
| 6,729,054 | B1 | 5/2004 | VanderTuin | |
| 6,741,222 | B1 | 5/2004 | Tucker | |
| 6,813,853 | B1 | 11/2004 | Tucker | |
| 6,816,389 | B1 | 11/2004 | Lutz et al. | |
| 6,831,653 | B2 * | 12/2004 | Kehlet et al. | 345/558 |
| 6,926,375 | B2 | 8/2005 | Nagamine et al. | |
| 6,966,674 | B2 | 11/2005 | Tsai | |
| 6,994,448 | B1 | 2/2006 | Gorrell | |
| 7,014,916 | B2 | 3/2006 | Tanabe | |
| 7,050,024 | B2 * | 5/2006 | LeChevalier | 345/84 |
| 7,055,271 | B2 | 6/2006 | Lutz et al. | |
| D526,361 | S | 8/2006 | Yasuoka et al. | |
| 7,344,902 | B2 | 3/2008 | Basin et al. | |
| 7,355,562 | B2 | 4/2008 | Schubert et al. | |
| 2002/0059742 | A1 | 5/2002 | Okazaki et al. | |
| 2002/0140655 | A1 | 10/2002 | Liang et al. | |
| 2003/0217495 | A1 | 11/2003 | Nagamine et al. | |
| 2004/0130536 | A1 | 7/2004 | Tanabe | |
| 2004/0150651 | A1 | 8/2004 | Phan | |
| 2005/0081414 | A1 | 4/2005 | Lutz et al. | |
| 2006/0092162 | A1 | 5/2006 | Deering et al. | |
| 2006/0105485 | A1 | 5/2006 | Basin et al. | |
| 2008/0048200 | A1 | 2/2008 | Mueller et al. | |
| 2008/0078733 | A1 | 4/2008 | Nearman et al. | |
| 2008/0141570 | A1 | 6/2008 | Nearman et al. | |

FOREIGN PATENT DOCUMENTS

| | | | |
|---|---|---|---|
| EP | 1699036 | A1 | 9/2006 |
| WO | WO-9108565 | A1 | 6/1991 |

OTHER PUBLICATIONS

"U.S. Appl. No. 11/271,404, Non-Final Office Action mailed Apr. 13, 2009", 4 pgs.

"U.S. Appl. No. 11/271,404, Official Action mailed Jan. 2, 2009", 5 pgs.

"U.S. Appl. No. 11/642,221, Final Office Action mailed Dec. 17, 2009", 6 pgs.

"U.S. Appl. No. 11/642,221, Non-Final Office Action mailed Mar. 16, 2009", 5 pgs.

"U.S. Appl. No. 11/642,221, Preliminary Amendment mailed Feb. 28, 2007", 9 pgs.

"U.S. Appl. No. 11/642,221, Response Filed Apr. 15, 2010 to Final Office Action mailed Dec. 17, 2009", 10 pgs.

"U.S. Appl. No. 11/642,221, Response filed Aug. 10, 2009 to Non-Final Office Action mailed Mar. 16, 2009", 9 pgs.

"U.S. Appl. No. 12/217,011, Preliminary Amendment and Filing Receipt Correction filed Sep. 2, 2008", 6 pgs.

"International Application Serial No. PCT/US06/36683, International Preliminary Report on Patentability completed Oct. 10, 2008", 6 pgs.

"International Application Serial No. PCT/US06/36683, International Search Report mailed Aug. 9, 2007", 1 pg.

"International Application Serial No. PCT/US06/36683, Written Opinion mailed Aug. 9, 2007", 4 pgs.

"International Application Serial No. PCT/US07/25456, International Search Report mailed Apr. 16, 2008", 1 pg.

"International Application Serial No. PCT/US07/25456, Written Opinion mailed Apr. 16, 2008", 4 pgs.

"International Application Serial No. PCT/US08/04808, International Search Report mailed Jul. 30, 2008", 2 pgs.

"International Application Serial No. PCT/US08/04808, Written Opinion mailed Jul. 30, 2008", 4 pgs.

"European Application No. 08742865.2, Extended European Search Report mailed Aug. 4, 2010", 7 pgs.

* cited by examiner

INTERLEAVED PIXELS

TRUE PIXEL

PIXEL INTERLEAVING CONFIGURATIONS FOR USE IN HIGH DEFINITION ELECTRONIC SIGN DISPLAYS

CROSS REFERENCES TO RELATED APPLICATIONS

This patent application is related to patent application Ser. No. 11/642,221 filed on Dec. 20, 2006, entitled "LED Display Module", which is pending, and which is a continuation of patent application Ser. No. 11/271,404 filed Nov. 10, 2005, entitled "Modular Display System", which is pending.

This application claims priority from the earlier filed U.S. Provisional Application No. 60/791,808 filed Apr. 12, 2006, entitled "Interleaved Pixel Concept SMD-Style LEDs". The prior application is hereby incorporated into this application by reference as if fully set forth herein.

BACKGROUND OF THE INVENTION

1. Field of the Invention

The present invention to electronic sign displays and, more particularly relates to pixel interleaving configurations for use in high definition electronic sign displays.

2. Description of the Prior Art

Prior art electronic sign displays have often incorporated a plurality of light emitting diodes (LEDs) as a prime emitter of light or points of light, whereby visual perception is processed by the eye of a viewer as a graphic presentation. Electronic sign displays have evolved from those having moderate resolution to those having an improved degree of resolution approaching or equaling high definition video, such as brought on by the advent of high definition (HD) television devices. There is a desire for high definition, i.e., high resolution, indoor or outdoor LED displays reflecting the current trend in the ever increasing quest for picture-like HD video quality. There are two primary standards for HD video, one is 720p and the other is 1080i. The 720p standard uses 720 progressively scanned lines of multiple pixel groups of full color red, green and blue (RGB) LEDs, where each RGB LED group constitutes a single pixel that collectively create a video image frame for accumulated perception as an image by the human eye. For example, a progressive scan could use 1/60th of a second for each frame. The other standard is the 1080i standard, that supports 1080 lines of resolution by interleaved scanning. In interleaved scanning, the odd lines are illuminated for 1/60th of a second followed by the even scan lines for 1/60th of a second, giving a full frame of data in 1/30th of a second. Each video standard is independent of the light emitting technology, and therefore can be supported by CRT (cathode ray tube), LCD (liquid crystal displays), plasma, or LEDs (light emitting diodes). Light emitting diode displays are often the preferred technology for large video displays because they are capable of creating a high contrast, bright display. Producing such high resolution light emitting displays requires the addition of LEDs where the quantity of LEDs are increased in great quantity to achieve desired clarity, resolution, definition and brightness. Because every pixel in those lines of resolution has a red, green, and blue component associated with it, every pixel should have a red, green, and blue LED to display all the video information available for that pixel element. LEDs are a very significant percentage of the cost of an LED screen, and therefore, a screen with 720 pixels high by some arbitrary number of pixels wide can be extremely expensive and, therefore, cost prohibitive for many users. Such an increase in the number of LEDs required for high definition resolution use can be problematic in terms of LED cost and in terms of energy usage. Size limitations are also a cause of concern. There are two approaches with respect to LED structuring when building a high definition electronic sign display. One approach uses a plurality of individual LEDs where each LED is an individual colored red, green, and blue LED, thereby forming a pixel. The physical size of these lamps along with the requirement to have at least three LEDs (red, green, and blue) limits how tightly the spacing can be between full color pixel elements. Alternatively, these lamp-style LEDs can be inserted through the circuit board as part of an LED package directly affixed to the face of the circuit board. This second approach is a surface mount device (SMD) package that preferably includes red, green, and blue LEDs in one package. Combining all three color diodes into such a single SMD LED package allows for tighter pixel spacing and is limited only by the size of the SMD package itself. In addition to typical video format displays, there are many applications pertaining to vertically small but very long displays. Some examples of these applications include financial ticker displays, or programmable electronic advertising displays, such as Daktronics, Inc. ProAd® product often found in stadiums and arenas. These displays are often between 1-4 feet tall, but can be tens or even hundreds of feet long. Vertical pixel resolution has a significant impact on the image quality of these displays and is beneficial to advertisers who want a high quality image when they are paying to advertise their product/company through the use of such a device. Clearly what is desired is a solution addressing the shortcomings of prior art devices where such a solution is introduced by the present invention.

SUMMARY OF THE INVENTION

The general purpose of the present invention is to provide pixel interleaving configurations for use in high definition electronic sign displays. The invention includes one or more red, green, and blue LED pixel configurations that are useful for optimizing the vertical resolution of LED video displays, especially high definition electronic sign displays. The following are key features or attributes of the invention:

1. Any pixel has at least 1 red, 1 green, and 1 blue (RGB) light emitting diode to form a full color element, but may be in different or varying configurations or native pixel arrangements, such as, but not limited to, the following basic configurations, whereby a pixel includes either: (a) individual LEDs including a grouping preferably of at least one red LED, one green LED, and one blue LED elements consisting of solely vertical LED alignment or consisting of triangular alignment or any other suitable arrangement; or (b) SMD (Surface Mount Device) LED packages of multiple elements including one red LED, one green LED, and one blue LED being closely grouped therein preferably in chevron (triangular alignment) style or other suitable arrangement.

2. There are odd and even lines of pixels. The even lines are horizontally offset from the odd lines to allow for tighter vertical pixel spacing while using either three individual (separate) red, green, blue LEDs or while using SMD LED packages according to 1. above.

3. The LED spacing within an individual LED (red, green, blue) style pixel or spacing from pixel-to-pixel can be flexible. Spacing of the LEDs may be compacted within the pixel to ease manufacturing and, as such, pixel boundaries can easily be visually seen and identified), or uniform spacing can be used to create an even fill-factor across the LED sign where the pixel boundaries blend together, preferably making it difficult to visually identify which individual LEDs belong with which pixel.

4. Pixel arrangements are scaleable as the pixel pitch between interleaved 3-in-1 SMD LED package pixels or separate red, green, blue SMD pixels is not limited to designs at 4 mm, 12.5 mm, 25 mm and the like, but can be implemented on any pitch between the pixels. This scaleability allows this invention to be used to develop a family of devices with a wide ranging offering of pixel spacing that can be used to build a sign format with the optimal viewing properties for any display applications.

According to one or more embodiments of the present invention, there are provided pixel interleaving configurations for use in high definition electronic sign displays where each scanned pixel includes a full complement of colored LEDs including the colors of red, green, and blue.

One significant aspect and feature of the present invention is an interleaved display where each scanned pixel includes red, green, and blue representation.

Another significant aspect and feature of the present invention is the offset of a succeeding line of pixels with a previous line of pixels.

Still another significant aspect and feature of the present invention is the reduction in the number of LEDs required in an electronic sign display by the use of interleaving of pixels while still maintaining a balanced and full red, green, and blue color representation in each scan row, often referred to as full color rows of resolution.

Yet another significant aspect and feature of the present invention is the use of pure pixel display concepts instead of virtual or dynamic pixeling.

A further significant aspect and feature of the present invention is the use of full color row resolution which does not experience color shift, which upholds high image and color quality, and which maintains high definition capabilities.

A still further significant aspect and feature of the present invention is that full color pixel content is provided for even use of the LEDs, whereby all LEDs age at an even rate.

A still further significant aspect and feature of the present invention decreases LED density while maintaining the number of full color resolution rows.

A further significant aspect and feature of the present invention prevents side angle color shift that occurs when LEDs are packed very closely together.

Having thus briefly described embodiments of the present invention and having mentioned some significant aspects and features of the present invention, it is the principal object of the present invention to provide pixel interleaving configurations for use in high definition electronic sign displays.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
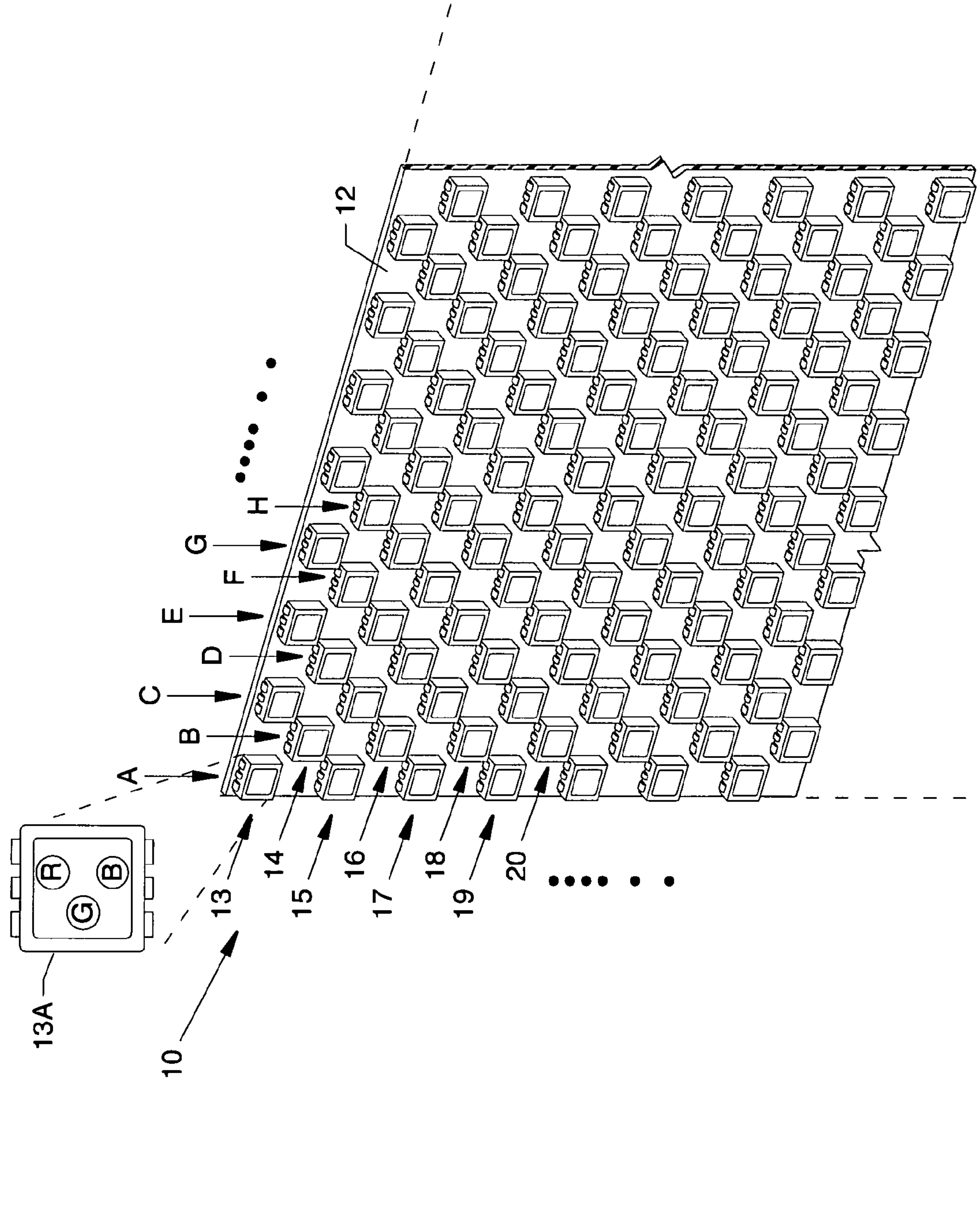
FIG. 1 is a segmented view showing a pixel interleaving configuration for use in high definition electronic sign displays, the present invention.

FIG. 1 is a segmented view showing a pixel interleaving configuration 10 for use in high definition electronic sign displays where a plurality of LED packages are arranged and mounted on a circuit board 12 which can be part of a high definition electronic sign display. The LED packages, each of which are a pixel, are arranged in alternating style having odd numbered rows 13, 15, 17, 19, and so on, alternating with even numbered rows 14, 16, 18, 20, and so on, where the even numbered rows 14, 16, 18, 20, and so on, are offset from the odd numbered rows 13, 15, 17, 19, and so on. Correspondingly, the LED packages are arranged in alternating style having columns A, C, E and G, and so on, alternating with columns B, D, F, H, and so on, where the columns B, D, F and H are offset from the columns A, C, E and G, and so on. The LED packages can be identified according to row and column. For example, the upper left LED package would be LED package 13A, the LED package beneath would be LED package 15A, and so on. An enlarged copy of the LED package 13A is shown distanced from the other LED packages. The LED package 13A and each of the other similar LED packages are a pixel, each including LED elements which can be generally smaller than individual LEDs which are a red LED, a green LED, and a blue LED indicated by the letters R, G and B arranged in chevron or triangular style or other suitable style.

Figure 2:
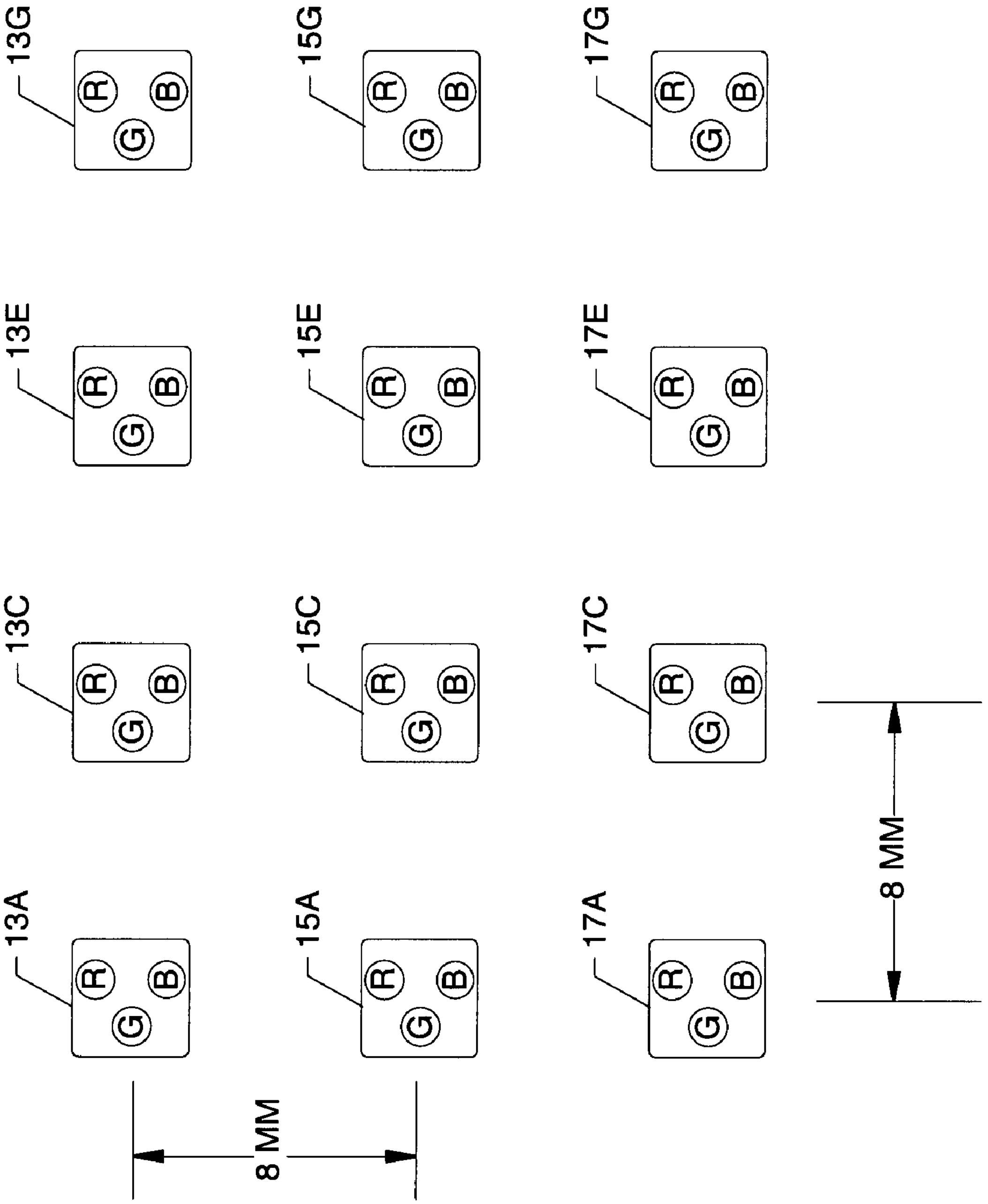
FIG. 2 and FIG. 3 are an overview of interleaving of pixels showing the use of LED packages (pixels) such as described and arranged in FIG. 1.
Figure 3:
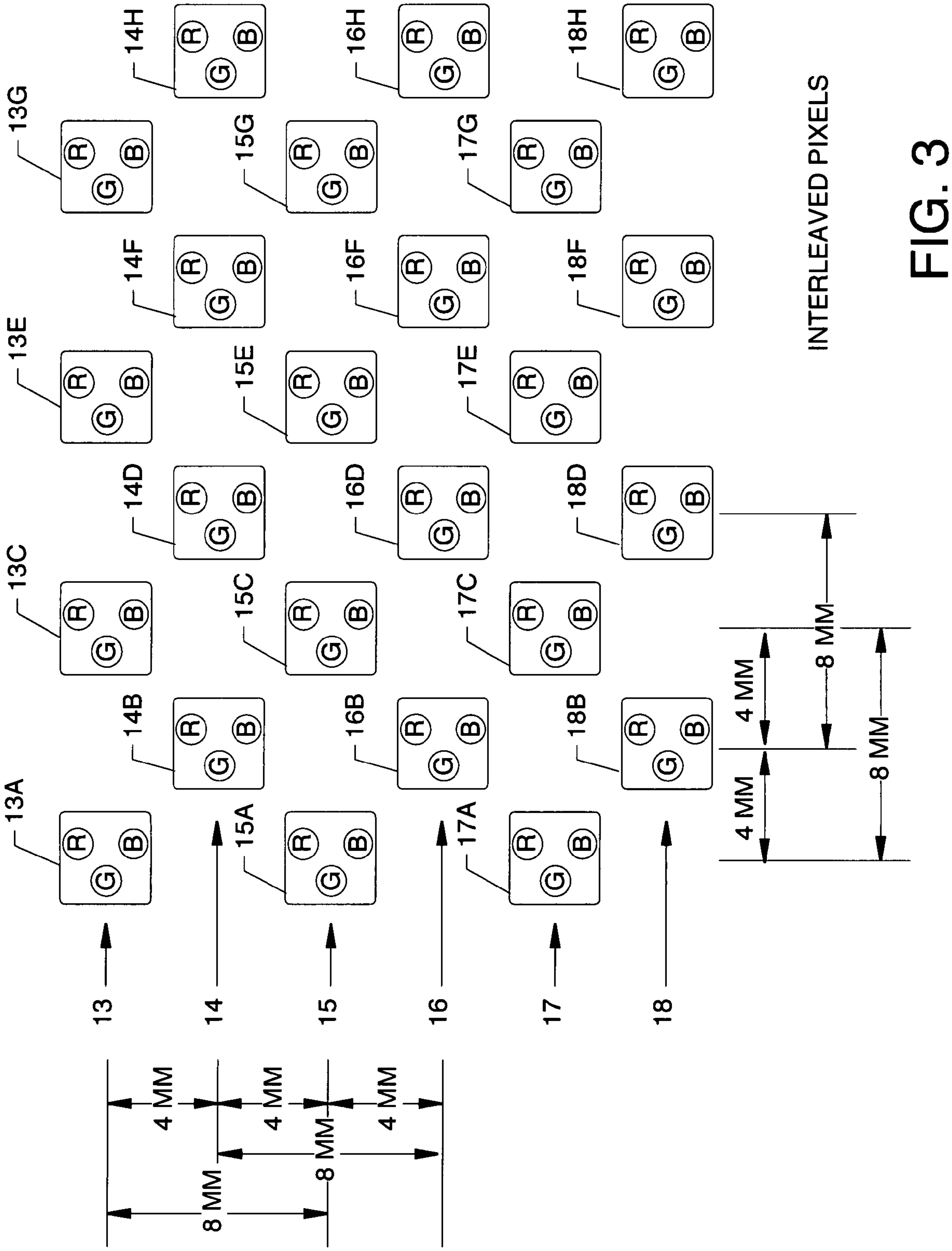
Figure 4:
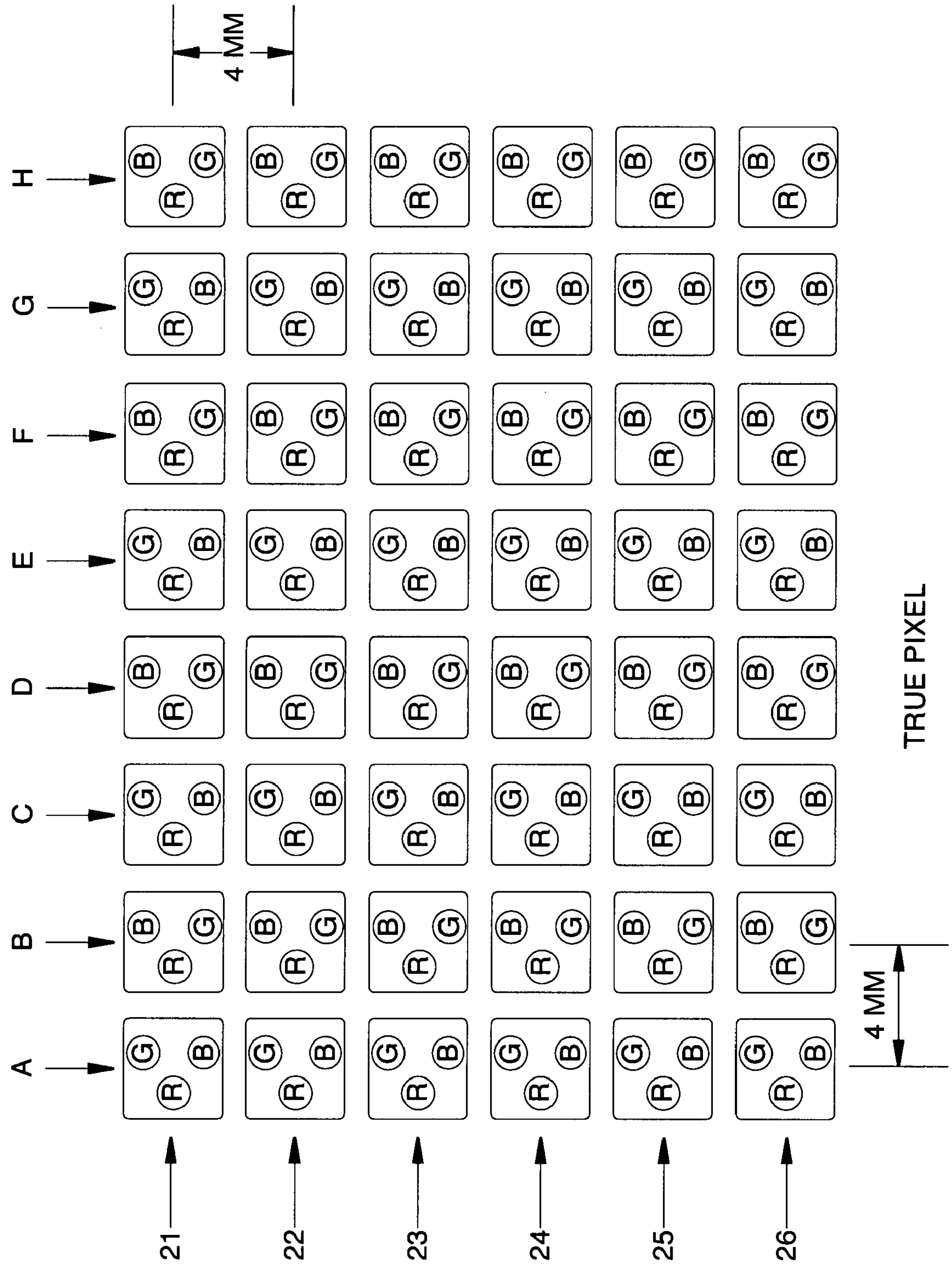
FIG. 4 shows LED packages (pixels) arranged in true pixel configuration.

FIG. 2 and FIG. 3 are used for an overview of interleaving pixels showing the use of LED packages (pixels), such as described and arranged in FIG. 1. For example, and as in FIG. 2, LED packages 13A, 13C, 13E, 13G, 15A, 15C, 15E, 15G, 17A, 17C, 17E, and 17G are distributed with the center of each aligned on vertical and horizontal 8 mm centers, thus creating pixels spaced at 8 mm. A proportionate number of additional pixels 14B, 14D, 14F, 14H, 16B, 16D, 16F, 16H, 18B, 18D, 18F and 18H (FIG. 3) are then interleavingly distributed in uniform fashion as shown in FIG. 3, substantially between or suitably spaced as illustrated with reference to LED packages 13A, 13C, 13E, 13G, 15A, 15C, 15E, 15G, 17A, 17C, 17E, and 17G in alignment with other and additional offset vertical and horizontal 8 mm centers resulting in another 8 mm spaced interleaved pixel arrangement, where the term "pixel interleaving" or "interleaved" is in preferred use by Daktronics, Inc. of Brookings, S. Dak. More precisely, LED package 14B is centrally located in the space below LED packages 13A and 13C and above LED packages 15A and 15C, the LED package 16B is centrally located in the space below LED packages 15A and 15C and above LED packages 17A and 17C, and so on in the same fashion. Other LED packages are not shown for the purpose of brevity and clarity. Such an arrangement of LED packages (pixels) results in an interleaved arrangement of LED packages (pixels) with 4 mm vertical and horizontal spacing. By using positional pixel processing, that processes the signal in relation to the location of the pixel, the colors blend with their own pixel but the viewer's eyes also blend with the color produced by a neighboring pixel. With this type of interleaved layout combined with positional pixeling technology, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. In the illustration provided by FIG. 3, 24 LED packages using interleaved "pure pixel" design are used, whereas 48 LED packages are used in the illustration provided in FIG. 4 using a non-interleaved "true pixel" design, a term which is in preferred use by Daktronics, Inc. of Brookings, S. Dak., obviously providing an economical solution to pixel quantity where, in FIG. 4, LED packages (pixels) are shown arranged in rows 21 through 26 and columns A through H. Such economy is more significant when comparing larger high definition electronic sign displays. For example, such an interleaving using the 4 mm interleaved pixel spacing of FIG. 3 requires 3,906 LED packages using interleaved pixel design to populate a one square meter high definition electronic sign display which, significantly, is half of the 7,812 LED packages required to populate a "true pixel" high definition electronic sign display represented in FIG. 4 having 4 mm pixel spacing. Such interleaved configurations can be scaled to larger spacings. For instance, larger LED packages (pixels) having correspondingly larger LEDs or individual red, green, and blue LEDs in groups (pixels) can be scaled upwardly to include, for example, 8 mm, 12.5 mm, 16 mm and the like. For example, a pure pixel (interleaved) design having 12.5 mm spacing using individual LEDs would require the use of 3200 red LEDs, 3200 green LEDs, and 3200 blue LEDs to populate a one square meter high definition electronic sign display, whereas a "true pixel" design having 12.5 mm spacing would required the use of 6400 red LEDs, 6400 green LEDs, and 6400 blue LEDs to populate a one square meter high definition electronic sign display.

Figure 5:
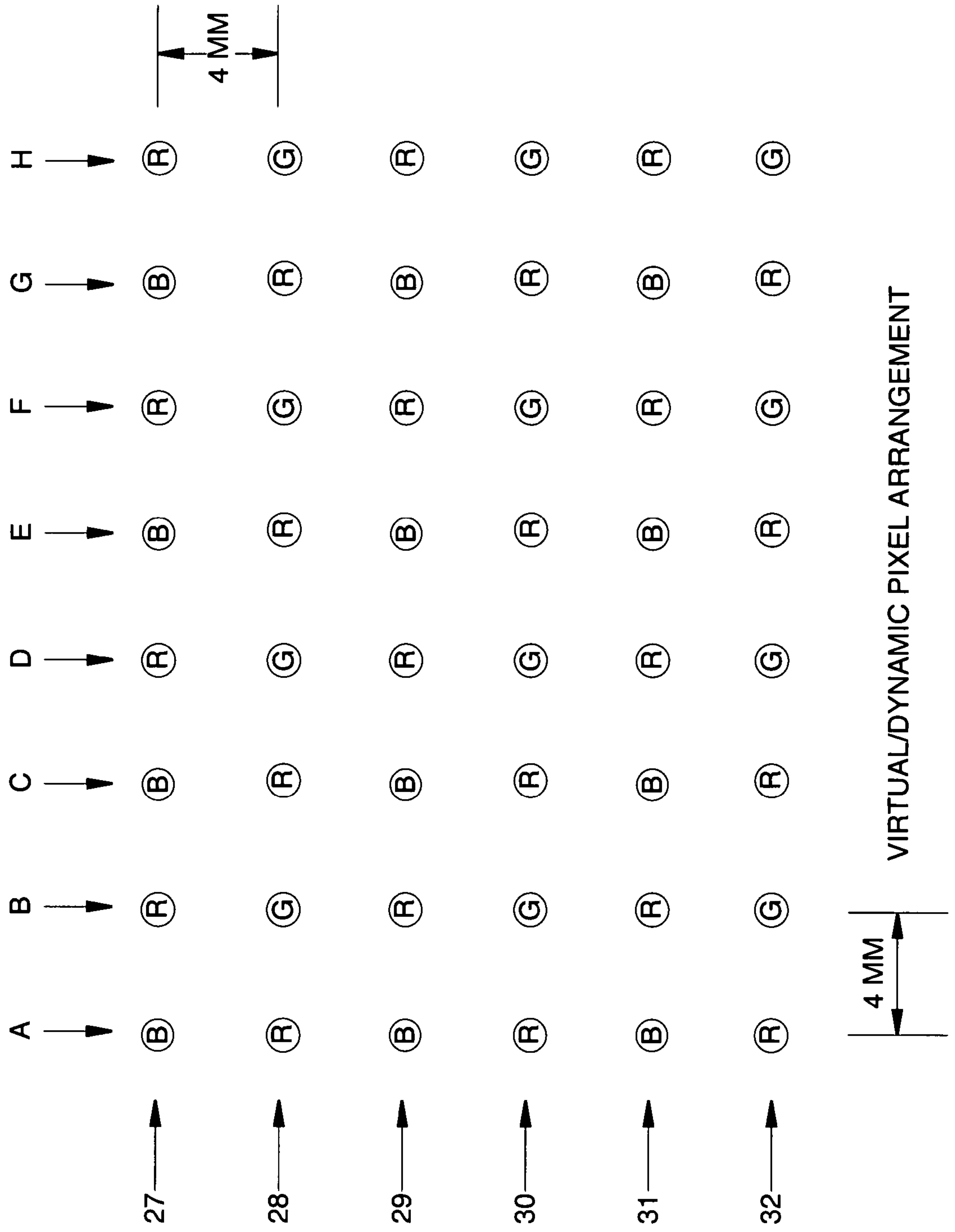
FIG. 5 for the sake of comparison shows a prior art virtual/dynamic pixel arrangement incorporating single colored LEDs which form pixels accounted for in various configuration designations such as known in the art.

For comparison, FIG. 5 shows a prior art virtual/dynamic pixel arrangement incorporating single colored LEDs which form pixels which can be accounted for in various configuration designations, such as known in the art where single colored LEDs are arranged in rows 27 through 32 and columns A through H of 4 mm vertical and horizontal spacing. Use of the interleave pixel spacing as described in FIG. 3 provides for scans involving the availability of red, green, and blue elements for use in each scan line. For example, a scan of line 13 of FIG. 3 involves the availability of four red LED elements, four green LED elements, and four blue LED elements of the LED packages 13A, 13C, 13E and 13G, whereas a scan of a corresponding line 27 of FIG. 5 involves the availability of four red LEDs, zero green LEDs, and four blue LEDs where green LEDs are under-represented, i.e., nonexistent. In a similar fashion, a scan of line 14 of FIG. 3 involves the availability of four red LED elements, four green LED elements, and four blue LED elements of the LED packages 14B, 14D, 14F and 14H, whereas a scan of a corresponding line 28 of FIG. 5 involves the availability of four red LEDs, four green LEDs, and zero blue LEDs where blue LEDs are under-represented, i.e., nonexistent. Additional following scan patterns repeatingly exhibit the same characteristics where a shortage of green and blue color representation exists with reference to the scan lines of the virtual/dynamic pixel arrangement shown in FIG. 5 and where, preferably, an even and balanced red, green, and blue color representation exists with reference to the scan lines of the interleaved pixel arrangement shown in FIG. 3. It is noted that the interleaved pixel arrangement of FIG. 3, like the "true pixel" arrangement of FIG. 4, includes scan lines of full color representation.

Figure 6:
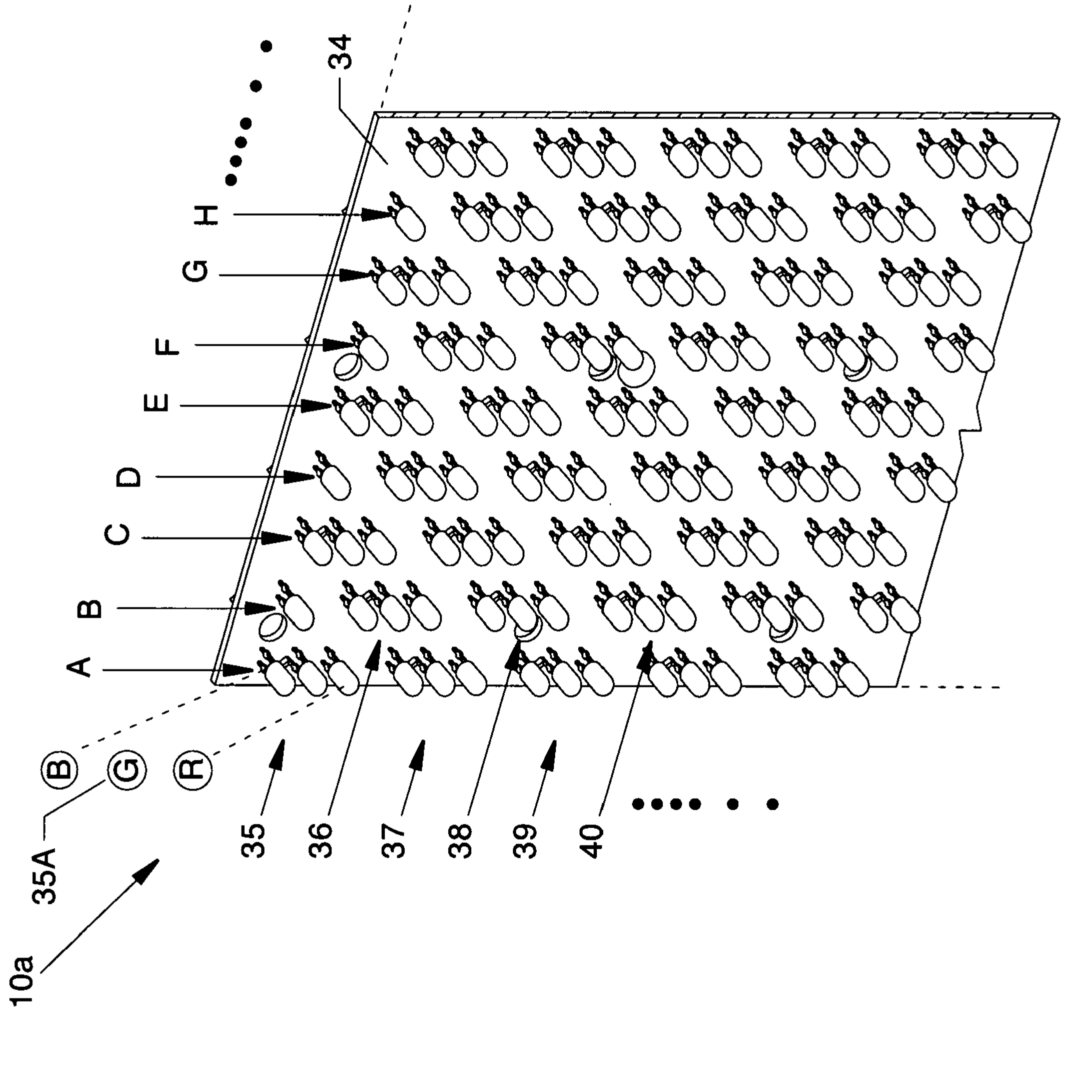
FIG. 6 is a segmented view showing a pixel interleaving configuration for use in high definition electronic sign displays where a plurality of individual LEDs form pixels.

FIG. 6 is a segmented view showing a pixel interleaving configuration 10*a* for use in high definition electronic sign displays where a plurality of individual LEDs form pixels which are arranged for use on a circuit board 34 which can be part of a high definition electronic sign display. Each pixel consists of an individual red LED, an individual green LED, and an individual blue LED in vertical alignment where the pixels are arranged in alternating style having odd numbered rows 35, 37, 39 and so on alternating with even numbered rows 36, 38, 40 and so on where the even numbered rows 36, 38, 40 are offset from the odd numbered rows 35, 37, 39. Correspondingly, the pixels are arranged in alternating style having columns A, C, E, G and so on alternating with columns B, D, F, H and so on where the columns B, D, F, H are offset with respect to the columns A, C, E, G, whereby the pixels can be identified according to row and column. For example, the upper left pixel would be pixel 35A, the pixel beneath would be pixel 37A and so on. An enlarged copy of the pixel 35A is shown distanced from the other pixels. The pixel 35A and each of the other pixels are similar in construction.

Figure 7:
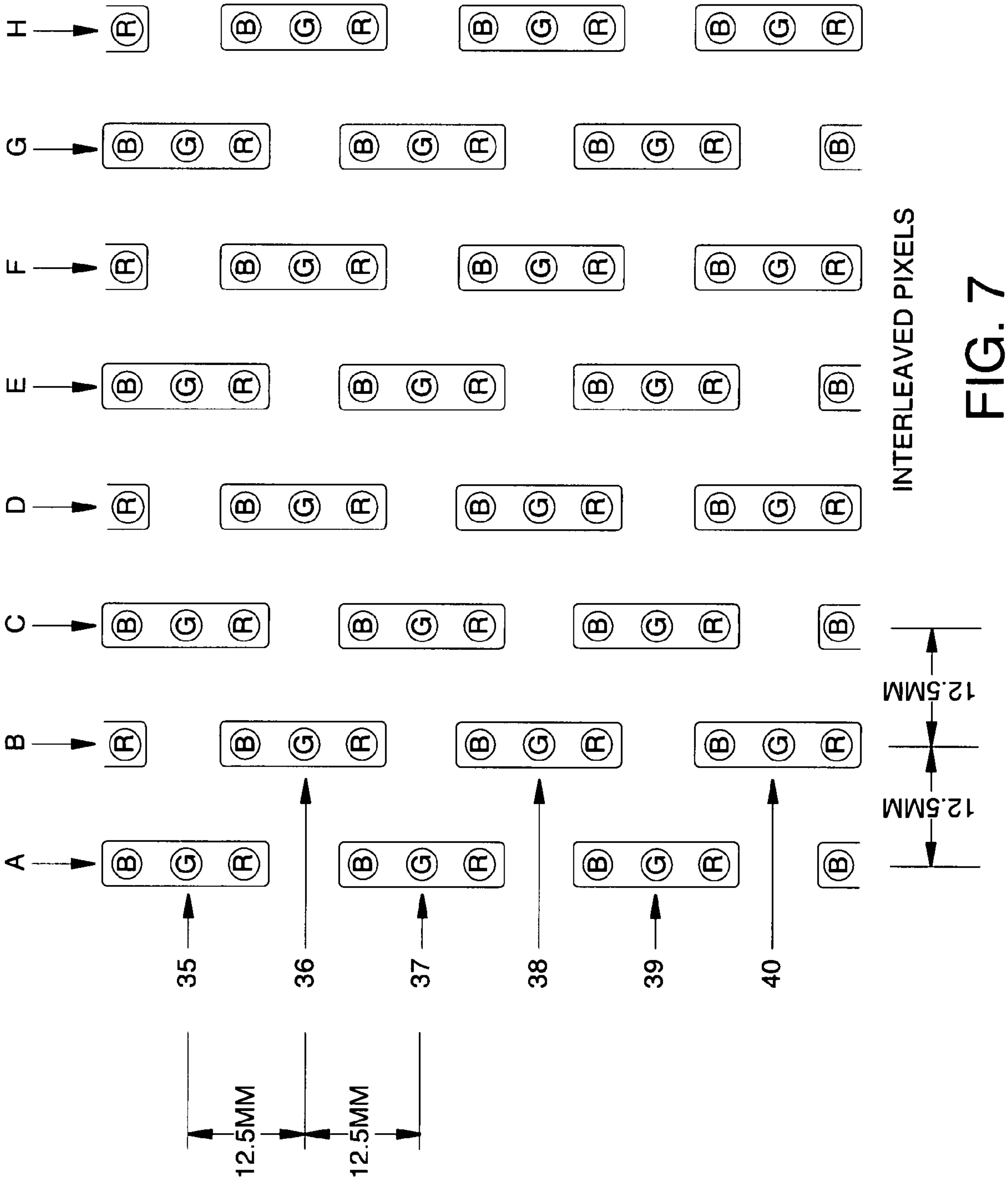
FIG. 7 is an illustration showing interleaving of pixels comprised of individual LEDs such as described and arranged in FIG. 6; and, FIG. 8 illustrates resolution enhancement such as offered by interleaving.

FIG. 7 is an illustration showing interleaving of pixels comprised of individual LEDs, such as described and arranged in FIG. 6. For example, and as in FIG. 6, pixels 35A, 35C, 35E, 35G, 37A, 37C, 37E, 37G, 39A, 39C, 39E, and 39G are distributed with the center of each (a green LED) aligned on vertical and horizontal 12.5 mm centers thus creating pixels spaced at 12.5 mm. A proportionate number of additional pixels 36B, 36D, 36F, 36H, 38B, 38D, 38F, 38H, 40B, 40D, 40F and 40H are interleavingly distributed in uniform fashion substantially between or suitably spaced as illustrated with reference to pixels 35A, 35C, 35E, 35G, 37A, 37C, 37E, 37G, 39A, 39C, 39E, and 39G in alignment with other and additional offset vertical and horizontal 12.5 mm centers resulting in an 12.5 mm spaced interleaved pixel arrangement, where the term "pixel interleaving" or "interleaved" is in preferred use by Daktronics, Inc. of Brookings, S. Dak. More precisely, pixel 36B is centrally located in the space below pixels 35A and 35C and above pixels 37A and 37C, the pixel 38B is centrally located in the space below LED pixels 37A and 37C and above pixels 39A and 39C and so on in a suitable fashion. Other pixels are not shown for the purpose of brevity and clarity. Such an arrangement of pixel results in an interleaved arrangement of pixels with 12.5 mm vertical and horizontal spacing. By using positional pixel processing, the colors blend with their own pixel but the viewer's eyes also blend with the color produced by a neighboring pixel. With this type of interleaved layout, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. For example, a scan of line 35 of FIG. 7 involves the availability of four red LED elements, four green LED elements, and four blue LED elements of the pixels 35A, 35C, 35E and 35G. In a similar fashion, a scan of line 36 involves the availability of four red LED elements, four green LED elements, and four blue LED elements of the pixels 36B, 36D, 36F and 36H. Additional following scan patterns repeatingly exhibit the same characteristics where, preferably, an even and balanced red, green, and blue color representation exists with reference to the scan lines of the interleaved pixel arrangement shown in a manner such as previously described with reference to FIG. 3. It is noted that the interleaved pixel arrangement of FIG. 7, like the "true pixel" arrangement of FIG. 4, includes scan lines of full color representation.

MODE OF OPERATION

Figure 8:
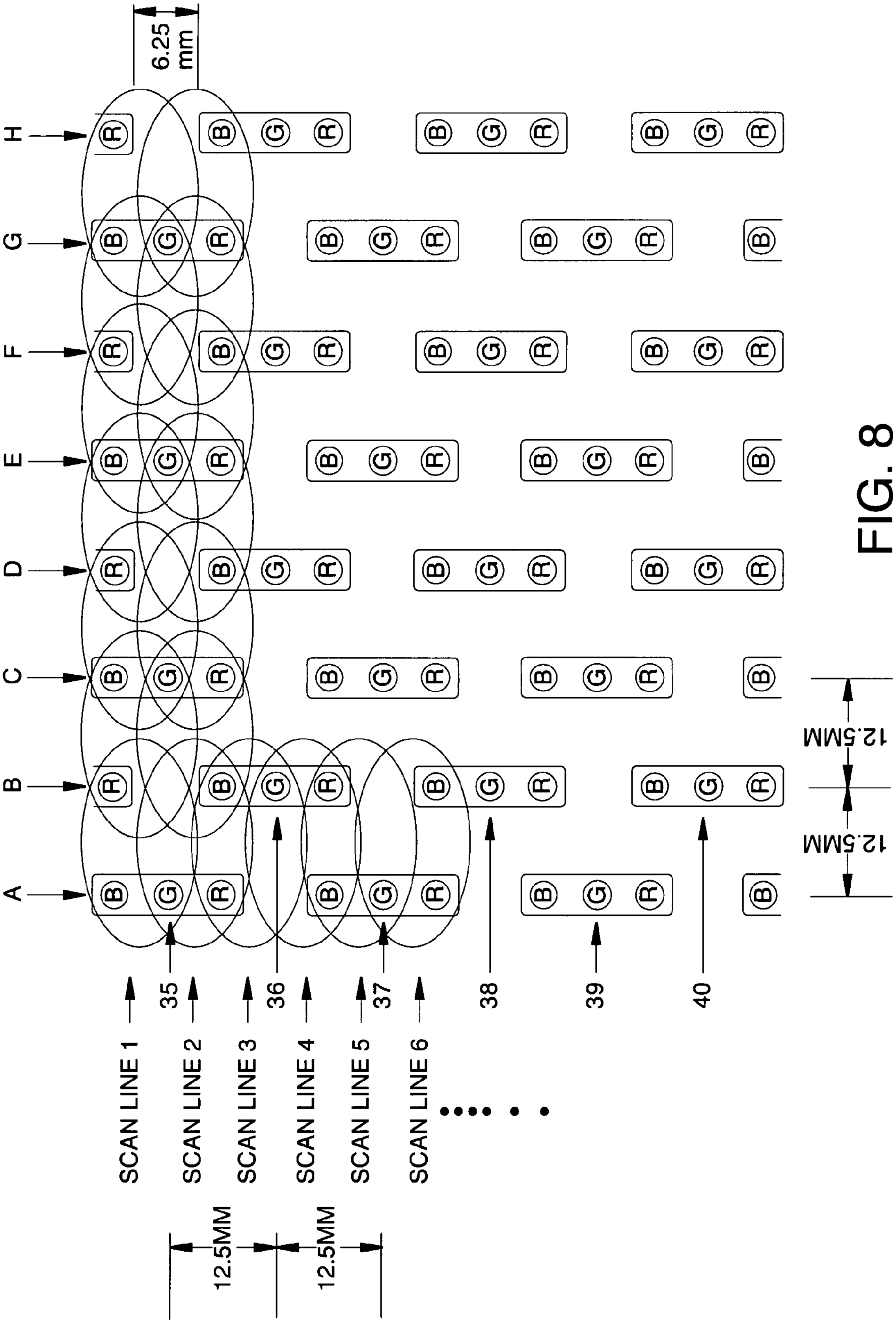

FIG. 8 illustrates resolution enhancement such as offered by interleaving, such as shown in FIG. 7. Individual control of red, green, and blue LEDs is exercised over each individual red, green, or blue LED regardless of the native pixel in which each is contained. Such control includes, but is not limited to, operating or not operating the desired colored individual LED and operation of an individual LED at a desired intensity. Individual red, green, and blue LEDs are grouped in real time to increase the perceived line count and overall resolution of a high definition electronic sign display. Such a sub-pixel processing method effectively doubles the native full-color count of the display to deliver smoother curves and greater image detail. Interleaved scanning is used to produce a set of alternating scan lines that are odd or even numbered. Consider scan line 1 (an odd number scan line) and scan line 2 (an even number scan line) during positional pixel processing where the human eye visually and temporally combines LED colors perceived in a 720 line frame. In scan line 1, the colors of a complete group of red green, and blue LEDs are perceived to be located as shown encircled by an ellipse albeit the LEDs reside in different native pixels, i.e., the blue and green LEDs of pixel 35A and the red LED of the partial pixel above pixel 36B are involved. This sequence repeats along scan line 1 and the other odd scan lines where each incremental portion of each scan line includes red, blue and green LEDs. Immediately following a full scan along scan line 1 and all following odd scan lines, another scan along scan line 2, and all following even scan lines, are initiated beginning with the green and red LEDs of pixel 35A and the blue LED of pixel 36B. The very next scan of line 2 proceeds to another complete group of red, green, and blue LEDs involving the blue LED of pixel 36B and the green and red LEDs of pixel 35C. This sequence repeats along scan line 2 where each incremental portion of scan 2 includes red, green, and blue LEDs until completing a full scan of even numbered scan lines. Hence, scan line 1 is painted on using the image information from the scan line 1 of the incoming image, and scan line 2 is painted on with the information from scan line 2 of the incoming image. The shared green LED in this example is imbued with information from both scan line 1 and scan line 2 in relation to the position of this shared green LED. The positional information involves a combination of an interpolated site (weighted average), as well as filters, to remove false color artifacts. Consider scan line 2 and scan line 3, the red and blue LEDs are shared devices on these two lines. The information used to drive these LEDs is a weighted average of the incoming scan lines 2 and 3 with the weighting of the average oriented to the location of these red and blue LEDs. The weighted averaging is performed before transmission of data to the display. To minimize the transmission overhead of the extra information of the shared devices, the green LEDs that are shared on scan lines 1 and 2 are transmitted as part of the information for the blue and red LEDs of scan line 1. The positional image information that is shared on the red and blue devices between scan lines 2 and 3 is transmitted with the information for the green LEDs on scan line 3. This decimation of transmitted data allows for control of the full color scan lines without increasing the transmission bandwidth. Although the pixels are vertically spaced at 12.5 mm each, scan line centers at 6.25 mm spacing where each scan line includes a full compliment of red, green, and blue LEDs as opposed virtual/dynamic pixel arrangements which lack in full color complements for each scan line. Scanning continues in this sequence along the entire frame to achieve 720 scan lines of full red, green, and blue color resolution. Arranging the pixels in interleaving fashion provides spacing which prevents side angle color shift that occurs when LEDs are packed very closely together and creates situations where the plastic lens of LED devices shoulders and blocks the light of other LEDs. The positional pixel processing technology can also be applied to the pixel interleaving configuration 10*a* shown and described starting in FIG. 1.

Various modifications can be made to the present invention without departing from the apparent scope thereof.

It is claimed:

1. An electronic display comprising:

a plurality of electronically scannable lines including LED pixels, each LED pixel having one red LED, one green LED and one blue LED associated therewith;

the plurality of electronically scannable lines including, a first scannable line having a plurality of horizontally spaced LED pixels; and a second scannable line having a plurality of horizontally spaced LED pixels, the second scannable line being spaced at least partially below the first scannable line with each intermediate pixel in the second scannable line being equally spaced from and positioned between an adjacent pair of pixels in the first scannable line, wherein the number of electrically scannable lines and the number of LED pixels in each electronically scannable line is sufficient to provide a predetermined display area.

2. The electronic display of claim 1, wherein the plurality of electronically scannable lines including LED pixels are positioned and supported on a circuit board.

3. The electronic display of claim 2, wherein the LED pixels on the circuit board age at a substantially even rate.

4. The electronic display of claim 1, wherein the red LED, the green LED and the blue LED in each pixel are spaced from, and in vertical alignment with, one another.

5. The electronic display of claim 4, wherein one of the red LED, the green LED and the blue LED is located at a top position, one of the remaining two LEDs is located at a bottom position, and the remaining LED is located at a middle position, equally spaced from the top and bottom positions.

6. The electronic display of claim 5, wherein the second scannable line is spaced in an interleaved manner with respect to the first scannable line, such that the LED located at the top position of each pixel in the second scannable line is in horizontally spaced alignment with the LED located at the bottom position of each pixel in the first scannable line.

7. The electronic display of claim 6, wherein each successive scannable line, of the plurality of electronically scannable lines, has the same physically spatial relationship as the first and second electronically scannable lines, such that each successive scannable line is interleaved with its preceding scannable line.

8. The electronic display of claim 6, wherein the interleaved arrangement substantially prevents side angle color shift.

9. The electronic display of claim 1, wherein the red LED, the green LED and the blue LED in each pixel are arranged in a triangular configuration.

10. The electronic display of claim 9, wherein two of the red LED, the green LED and the blue LED are in vertically spaced alignment with one another and form two corners of the triangular configuration, and the other of the red LED, the green LED and the blue LED forms the remaining corner of the triangular configuration.

11. The electronic display of claim 1, wherein the plurality of electronically scannable lines further includes, a third scannable line having a plurality of horizontally spaced LED pixels, the third scannable line being spaced below the second scannable line with each pixel in the third scannable line being in vertical alignment with a corresponding pixel in the first scannable line; and a fourth scannable line having a plurality of horizontally spaced LED pixels, the fourth scannable line being spaced below the third scannable line with each pixel in the fourth scannable line being in vertical alignment with a corresponding pixel in the second scannable line.

12. The electronic display of claim 11, wherein each successive scannable line, of the plurality of electronically scannable lines, is spaced below a preceding scannable line with each pixel in the successive line being alternately vertically aligned with a corresponding pixel in a preceding scannable line twice removed therefrom.

13. The electronic display of claim 1, wherein the second scannable line is horizontally offset from the first scannable line.

14. An electronic display comprising:

a plurality of electronically scannable lines including LED pixels, the plurality of electronically scannable lines including alternately even numbered scannable lines and odd numbered scannable lines, each LED pixel having one red LED, one green LED and one blue LED associated therewith, each even numbered scannable line having a plurality of horizontally spaced LED pixels therein, each odd numbered scannable line having a plurality of horizontally spaced LED pixels therein, each alternate odd numbered scannable line being spaced adjacently below, at least in part, an even numbered scannable line with each intermediate pixel in the odd numbered scannable line being equally spaced from and between two adjacently spaced pixels in the even numbered scannable line, and wherein the number of electrically scannable lines and the number of LED pixels in each electronically scannable line is sufficient to provide a predetermined display area.

15. The electronic display of claim 14, wherein the plurality of electronically scannable lines of LED pixels are positioned and supported on a circuit board.

16. The electronic display of claim 14, wherein the red LED, the green LED and the blue LED in each pixel are spaced from, and in vertical alignment with, one another.

17. The electronic display of claim 16, wherein one of the red LED, the green LED and the blue LED is located at a top position, one of the remaining two LEDs is located at a bottom position, and the remaining LED is located at a middle position, equally spaced from the top and bottom positions.

18. The electronic display of claim 17, wherein each of the odd numbered scannable lines are spaced in an interleaved manner with respect to each of the even numbered scannable lines, such that the LED located at the top position of each pixel in the odd numbered electronically scannable line is in horizontally spaced alignment with the LED located at the bottom position of each pixel in the even numbered scannable line.

19. The electronic display of claim 18, wherein each successive scannable line, of the plurality of electronically scannable lines, has the same physically spatial relationship as the even numbered and the odd numbered scannable lines, such that each successive scannable line is interleaved with its preceding scannable line.

20. The electronic display of claim 14, wherein the red LED, the green LED and the blue LED in each pixel are arranged in a triangular configuration.

21. The electronic display of claim 20, wherein two of the red LED, the green LED and the blue LED are in vertically spaced alignment with one another and form two corners of the triangular configuration, and the other of the red LED, the green LED and the blue LED forms the remaining corner of the triangular configuration.

* * * * *